UNITED STATES PATENT OFFICE.

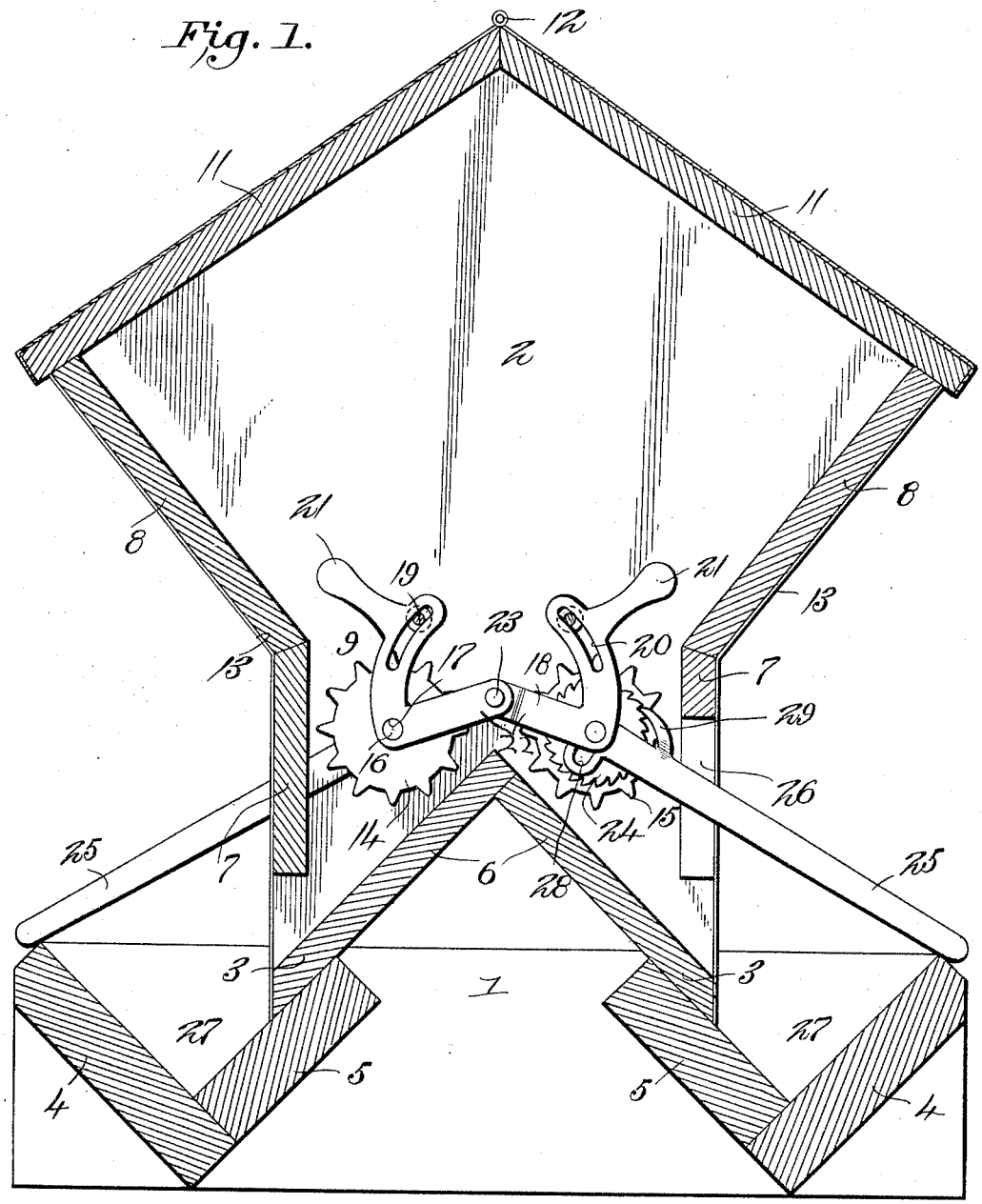

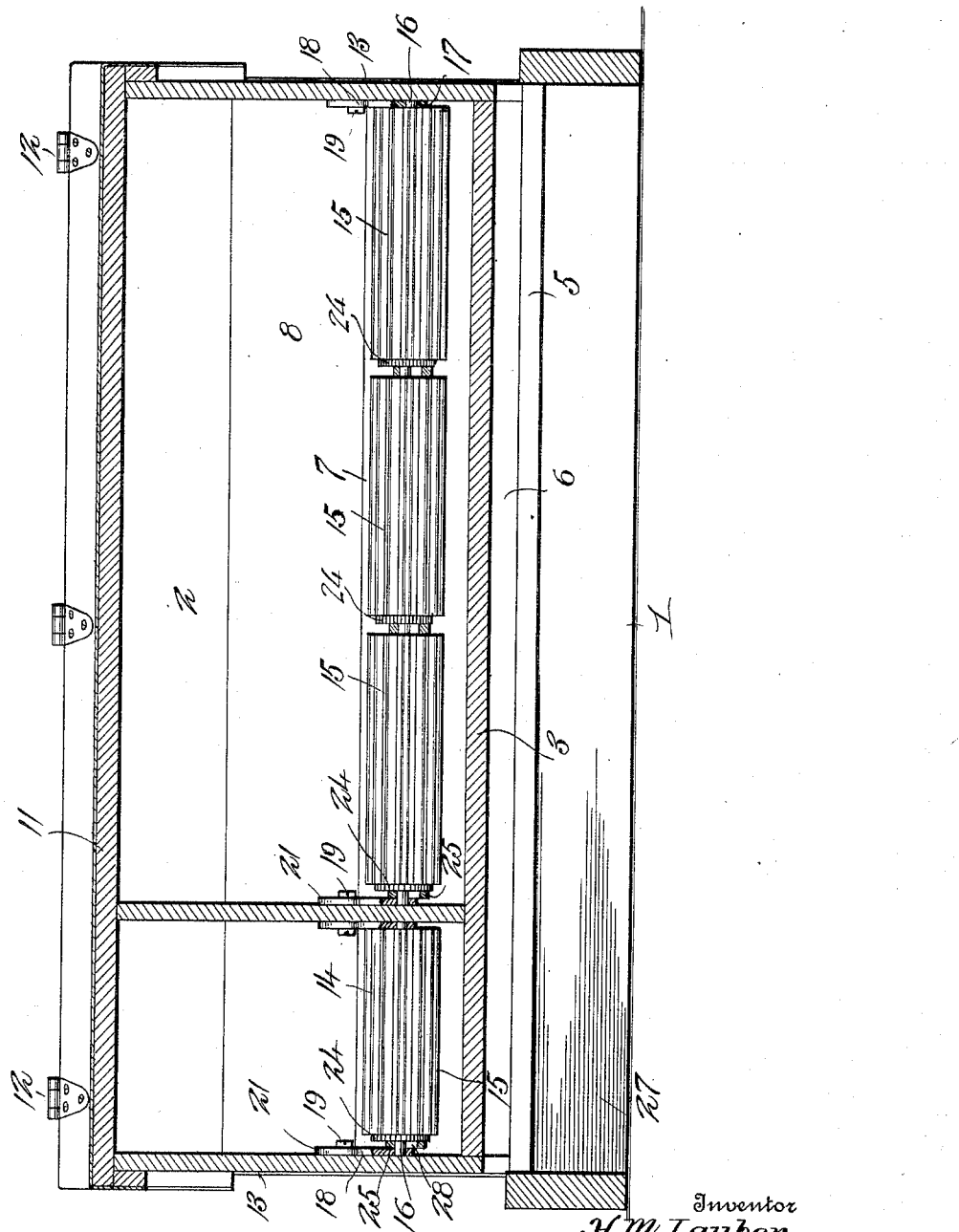

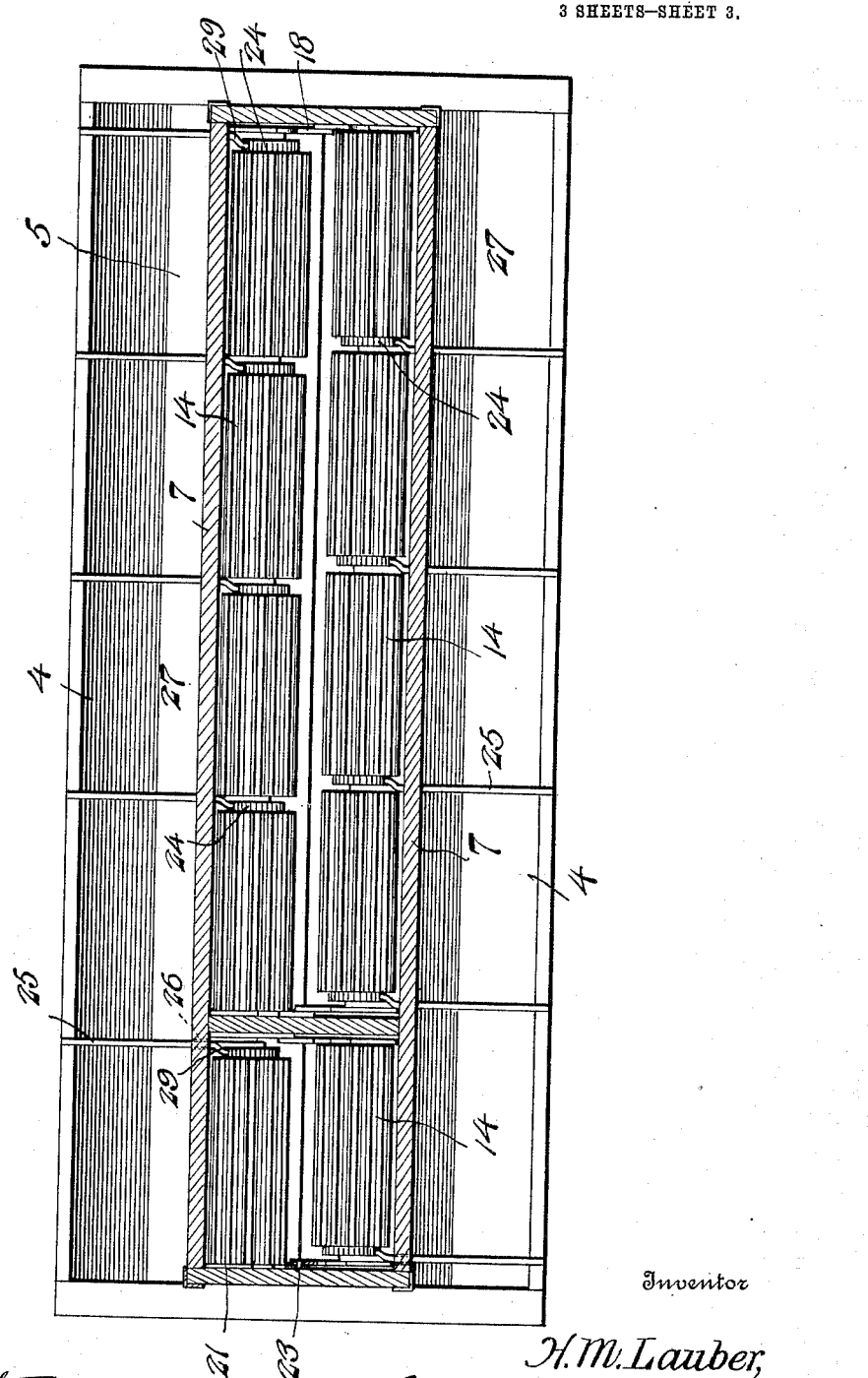

HENRY M. LAUBER, OF SAVANNAH, MISSOURI.

HOG-FEEDER.

1,099,063.   Specification of Letters Patent.   Patented June 2, 1914.

Application filed February 1, 1913. Serial No. 745,669.

*To all whom it may concern:*

Be it known that I, HENRY M. LAUBER, a citizen of the United States, residing at Savannah, in the county of Andrew and State of Missouri, have invented new and useful Improvements in Hog-Feeders, of which the following is a specification.

This invention is an improved feeder for hogs, provided with grain or feed delivery mechanism having a lever arranged for operation by the animal and by means of which the grain or other feed is supplied in regulated quantities and as needed, the invention consisting in the construction, combination and arrangement of devices hereinafter described and claimed.

In the accompanying drawings:—Figure 1 is a vertical transverse sectional view of a hog feeder constructed in accordance with my invention. Fig. 2 is a vertical longitudinal sectional view of the same. Fig. 3 is a horizontal longitudinal sectional view of the same on a plane above the adjustable supports of the supply rollers, the pivots of said supports being indicated in sections.

My improved feeder comprises essentially a trough 1, a hopper 2 and means for supplying grain or other feed from the hopper to the trough. In the form of the invention here shown, the trough is substantially W-shaped in cross section comprising upwardly converging inner walls 3 and upwardly and outwardly inclined outer walls 4 which are lower than the inner walls the latter comprising lower boards 5 and upper boards 6 and in the present instance the said upper boards 6 also form the bottom of the hopper. The hopper has its side walls provided with vertical lower portions 7 and upwardly and outwardly inclined upper portions 8. The lower portions 7 of the side walls of the hopper form a contracted discharge throat 9 in the hopper immediately above the bottom thereof formed by the downwardly and outwardly inclined boards 6 and the said boards also form means to discharge grain or other feed by gravity from the hopper into the trough. The top of the hopper is formed by downwardly and outwardly inclined boards 11 one of which is hinged at its upper side as at 12. In practice, the roof or top boards of the hopper are preferably covered with galvanized iron or other sheet metal and the corners of the hopper are also preferably reinforced as at 13. The hopper and trough may be of any suitable length and the hopper may constitute only a single compartment or may be divided by partitions into a number of compartments.

In the throat of the hopper are feed supply rollers 14 provided with peripheral longitudinal wings 15. These supply rollers are arranged in pairs at opposite sides of the apex of the bottom of the hopper and are provided at their ends with journals 16 which are mounted in bearing openings 17 in adjustable supports 18. The adjustable supports are secured against the end walls or partition walls of the hopper by means of screws 19 which operate in curved walls 20 with which the said supports are provided, each of the said supports having an upwardly and outwardly extending handle or lever 21 and being also provided, at its lower end, with an inwardly extending arm 22, the arms of each pair of supports being pivotally connected together as at 23 and the curved slots 20 being concentric with said pivot 23. Hence, by first loosening the screws 19, the supports may be adjusted to raise or lower the feed supply rollers with respect to the inclined boards 6 which form the bottom of the hopper and, hence, the feed supply rollers may be arranged at any desired distance from the said bottom boards as will be understood. Each supply roller is provided at one end with a ratchet gear 24 and in connection with each feed supply roller, I provide an operating lever 25. This lever extends through a vertical slot 26 in one of the side wall members 7 of the hopper, is vertically and angularly movable, extends outwardly across one side of the trough or one of the trough members 27 on opposite sides of the hopper and its inner end is provided with a slot 28 through which one of the journals 16 of its companion feed supply roller 14 pass. Hence, each lever is not only pivotally mounted for movement in a vertical plane but its inner end is, by reason of its slot adapted for movement on the pivot journal. Each lever has a pawl or dog 29 integral therewith and projecting upwardly and also laterally therefrom and arranged to engage one of the ratchet gears 24.

When a hog in feeding from the trough has eaten nearly all the grain or feed within his reach in the bottom of the trough, his snout in his efforts to get at the feed will be run under the lever 25 so that said lever will be raised and its pawl or dog 29 by engagement with the ratchet gear 24 will cause the roller 14 to be partly rotated and such partial rotation of the roller, since the latter is in effect also a valve in the discharge throat of the hopper will cause another supply of grain or feed, regulated in quantity according to the adjustment of the roller, to be forced from the hopper and to drop down into the trough within reach of the animal. Hence, the device is self-feeding in the sense that it is operated by the feeding animals and waste of the feed is prevented. The levers 25 which extend across the trough also form bars which prevent the hogs from getting in or lying on the trough. Where the trough is provided with a number of compartments each having its own feed supply apparatus, one of the compartments may be used for supplying condition powders or the like to the trough.

While I have herein shown and described a preferred form of my invention, I would have it understood that changes may be made in the form, proportion and construction of the several parts without departing from the spirit of my invention and within the scope of the appended claims.

I claim:—

1. In a feeder of the class described, a trough, a hopper having a throat discharging into the trough, a feed supply valve roller mounted for rotation in the throat of the trough and provided with a ratchet gear, and a lever mounted for vertical angular movement, extending across and above the trough, normally bearing on the outside of the trough and provided with a pawl to engage the ratchet gear on the upstrokes of said lever and hence cause the latter to impart partial rotation to said feed supply roller.

2. In a feeder of the class described, a trough, a hopper having a throat discharging into the trough, a feed supply valve roller mounted for rotation in the throat of the trough and provided with a ratchet gear, and a lever mounted for vertical angular movement, extending across and above the trough, normally bearing on the outer side of the trough and provided with a pawl to engage the ratchet gear on the upstrokes of said lever and hence cause the latter to impart partial rotation to said feed supply roller, and means to adjust said feed supply roller toward and from the lower side of the discharge throat of the hopper.

3. In a feeder of the class described, a trough, a hopper having an inverted V-shaped bottom and a contracted throat above the bottom, a pair of feed supply rollers mounted above the bottom, in the throat and on opposite sides of the apex of the bottom, supporting members for the rollers in which the latter are mounted for rotation, said supporting members being pivotally connected together, means to permit independent adjustment of the supporting members, and actuating means for the feed supply rollers and including vertically movable levers extending across the trough.

In testimony whereof I affix my signature in presence of two witnesses.

HENRY M. LAUBER.

Witnesses:
 FRED HARTLEY,
 LLOYD W. BOOHER.

---

Copies of this patent may be obtained for five cents each, by addressing the "Commissioner of Patents, Washington, D. C."